(12) United States Patent
Lee et al.

(10) Patent No.: US 11,594,374 B2
(45) Date of Patent: Feb. 28, 2023

(54) MULTILAYER CERAMIC ELECTRONIC COMPONENT

(71) Applicant: SAMSUNG ELECTRO-MECHANICS CO., LTD., Suwon-si (KR)

(72) Inventors: Kyo Yeol Lee, Suwon-si (KR); Seung Hun Han, Suwon-si (KR); Sang Wook Lee, Suwon-si (KR); Jung Min Kim, Suwon-si (KR); Jeong Ryeol Kim, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 0 days.

(21) Appl. No.: 17/338,370

(22) Filed: Jun. 3, 2021

(65) Prior Publication Data

US 2022/0208456 A1 Jun. 30, 2022

(30) Foreign Application Priority Data

Dec. 31, 2020 (KR) .................. 10-2020-0189100

(51) Int. Cl.
*H01G 4/224* (2006.01)
*H01G 4/008* (2006.01)
*H01G 4/30* (2006.01)

(52) U.S. Cl.
CPC ........... *H01G 4/224* (2013.01); *H01G 4/0085* (2013.01); *H01G 4/30* (2013.01)

(58) Field of Classification Search
CPC ................................. H01G 4/224; H01G 4/30
See application file for complete search history.

(56) References Cited

U.S. PATENT DOCUMENTS

| 4,377,619 | A | 3/1983 | Schonhorn et al. |
| 8,587,923 | B2 | 11/2013 | Ogawa et al. |
| 9,758,695 | B2 | 9/2017 | Hong et al. |
| 10,395,840 | B1 | 8/2019 | Park et al. |
| 2011/0309718 | A1* | 12/2011 | Ogawa .................. H01G 4/232 361/321.1 |
| 2019/0103224 | A1 | 4/2019 | Han et al. |

FOREIGN PATENT DOCUMENTS

| JP | 2000164406 A | * | 6/2000 |
| JP | 3444291 B2 | | 9/2003 |
| KR | 10-2019-0038237 A | | 4/2019 |
| KR | 10-2019-0121219 A | | 10/2019 |
| WO | 2014/027854 A1 | | 2/2014 |

* cited by examiner

*Primary Examiner* — Eric W Thomas
(74) *Attorney, Agent, or Firm* — Morgan, Lewis & Bockius LLP

(57) ABSTRACT

A multilayer ceramic electronic component includes: a ceramic body including dielectric layers and first internal electrodes and second internal electrodes disposed to face each other and alternately stacked with the respective dielectric layers interposed therebetween; a first external electrode connected to the first internal electrodes; a second external electrode connected to the second internal electrodes; and a protective layer disposed on the ceramic body, the first external electrode, and the second external electrode, wherein the protective layer includes an adhesion assisting layer and a coating layer.

35 Claims, 6 Drawing Sheets

MULTILAYER CERAMIC ELECTRONIC COMPONENT

CROSS-REFERENCE TO RELATED APPLICATION(S)

This application claims the benefit of priority to Korean Patent Application No. 10-2020-0189100, filed on Dec. 31, 2020 in the Korean Intellectual Property Office, the disclosure of which is incorporated herein by reference in its entirety.

TECHNICAL FIELD

The present disclosure relates to a multilayer ceramic electronic component.

BACKGROUND

Recently, in accordance with enlargement of a field of application of electronic products, a technical field in which multilayer ceramic electronic components are used has also been enlarged. In particular, in accordance with vehicle electronics (Vetronics), a structure in which an electronic control unit (ECU) or a transmission control unit (TCU) of a vehicle is disposed in an engine bay or is directly attached to a transmission has been used.

However, when an existing multilayer ceramic electronic component is used in a harsh environment such as a high temperature and high vibration environment, expansion and contraction due to high/low temperature cycles are repeated, resulting in continuous mechanical stress. In addition, continuous application of mechanical stress is a main cause of cracks occurring in terminal electrodes or solders.

In addition, in a process of manufacturing multilayer ceramic electronic components, in many cases, a plating layer is formed on an external electrode after a ceramic body and the external electrode are sintered. However, at the time of manufacturing an electronic component by high-temperature heat treatment, a hydrophilic oxide layer having high surface energy is formed on a surface of the ceramic body, and a possibility that pores that become paths through which moisture may penetrate will be generated at an interface between the ceramic body and the external electrode increases.

In particular, when the multilayer ceramic electronic component is continuously exposed to a high temperature and/or high humidity environment, a possibility that ion migration will occur in the external electrode of the multilayer ceramic electronic component itself increases. The oxide layer formed on the surface of the ceramic body has high surface energy, and allows moisture to easily adhere to the surface of the ceramic body due to a high temperature, a high humidity, and its hydrophilicity at the time of applying a voltage. An ion migration phenomenon in which an electrode material migrates toward an opposite electrode through such moisture occurs, and a problem that reliability of the multilayer ceramic electronic component decreases, such as a short circuit may occur.

SUMMARY

An aspect of the present disclosure may provide a multilayer ceramic electronic component of which deterioration of characteristics due to penetration of moisture may be prevented.

Another aspect of the present disclosure may provide a multilayer ceramic electronic component in which ion migration may be suppressed.

Another aspect of the present disclosure may provide a multilayer ceramic electronic component in which a defect such as a short circuit may be reduced.

Another aspect of the present disclosure may provide a multilayer ceramic electronic component having excellent reliability.

According to an aspect of the present disclosure, a multilayer ceramic electronic component may include: a ceramic body including dielectric layers and first internal electrodes and second internal electrodes disposed to face each other and alternately stacked with the respective dielectric layers interposed therebetween; a first external electrode connected to the first internal electrodes; a second external electrode connected to the second internal electrodes; and a protective layer disposed on the ceramic body, the first external electrode, and the second external electrode, wherein the protective layer includes an adhesion assisting layer and a coating layer.

According to another aspect of the present disclosure, a multilayer ceramic electronic component may include: a ceramic body including dielectric layers and first internal electrodes and second internal electrodes disposed to face each other and alternately stacked with the respective dielectric layers interposed therebetween; first and second external electrodes disposed on the ceramic body and connected to the first and second internal electrodes, respectively; and a cover layer including a first layer disposed on each of the first and second external electrodes, and a second layer disposed on each first layer, wherein the second layer covering the first external electrode and the second layer covering the second external electrode are connected to each other.

BRIEF DESCRIPTION OF DRAWINGS

The above and other aspects, features, and advantages of the present disclosure will be more clearly understood from the following detailed description taken in conjunction with the accompanying drawings, in which.

DETAILED DESCRIPTION

Figure 1:
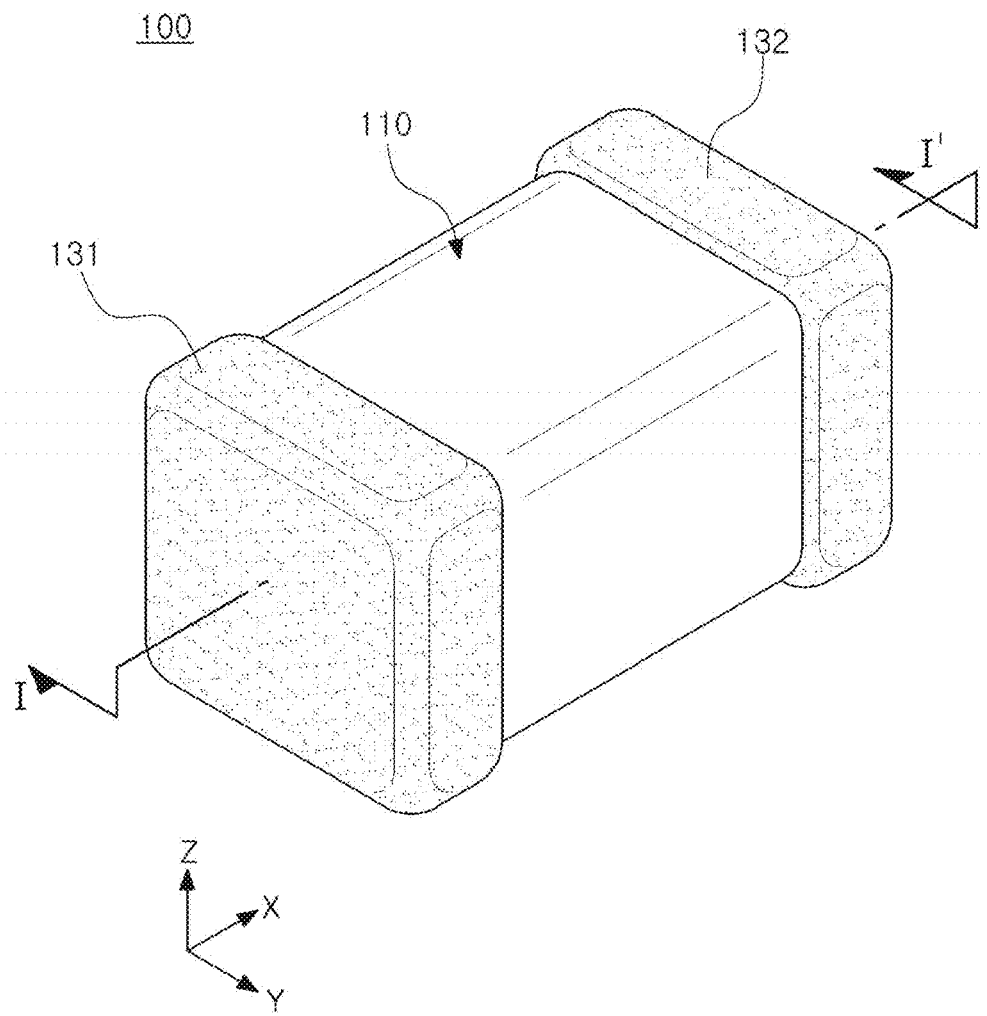
FIG. 1 is a schematic perspective view illustrating a multilayer ceramic electronic component according to an exemplary embodiment in the present disclosure.
Figure 2:
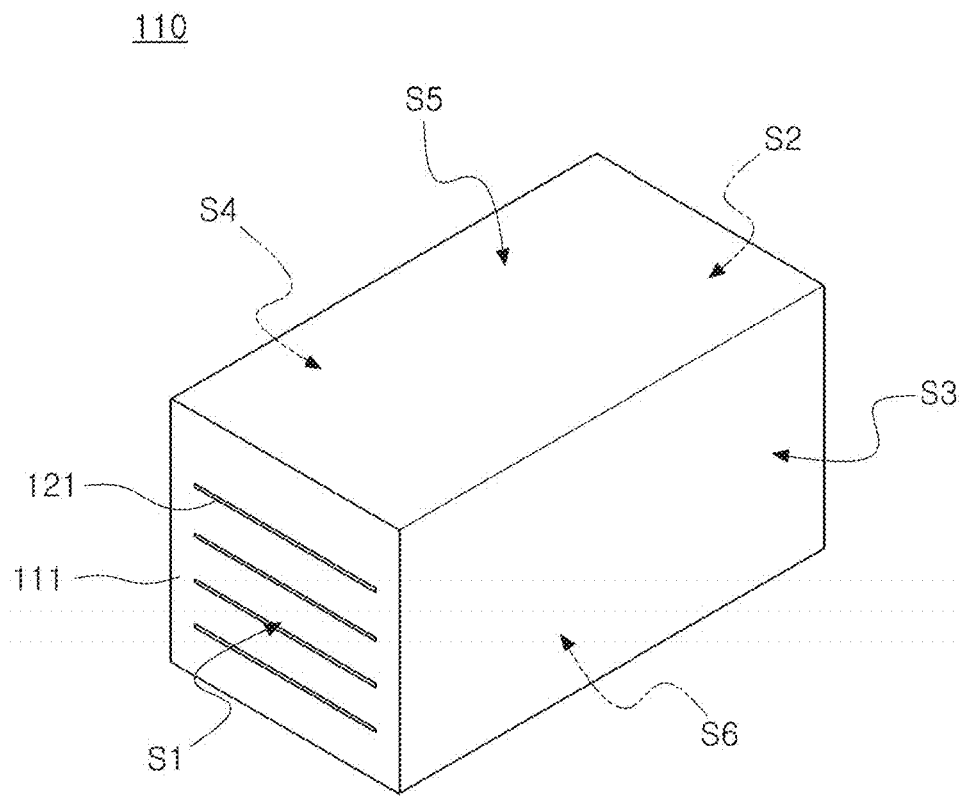
FIG. 2 is a schematic perspective view illustrating a ceramic body of FIG. 1.
Figure 3:
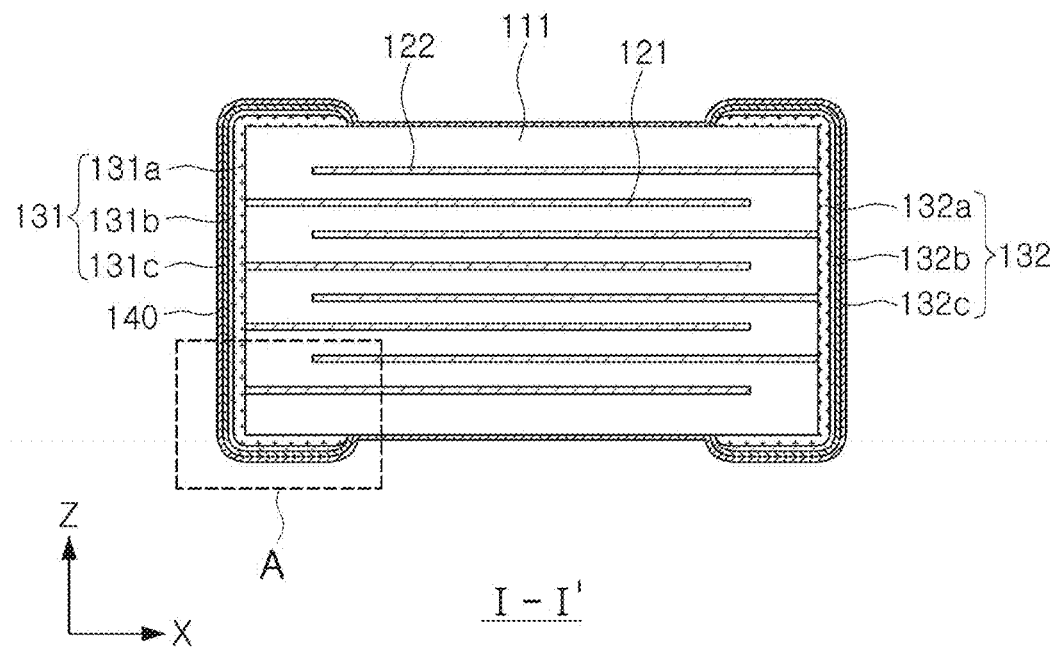
FIG. 3 is a cross-sectional view taken along line I-I' of FIG. 1.
Figure 4:
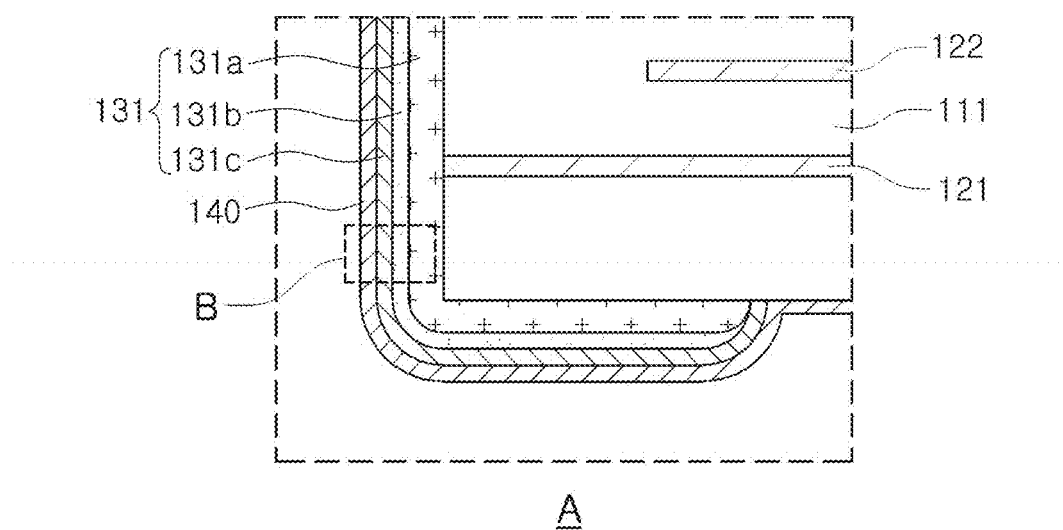
FIG. 4 is an enlarged view of region A of FIG. 3.

Hereinafter, exemplary embodiments of the present disclosure will now be described in detail with reference to the accompanying drawings.

In the drawings, an X direction refers to a first direction, an L direction, or a length direction, a Y direction refers to a second direction, a W direction, or a width direction, and a Z direction refers to a third direction, a T direction, or a thickness direction.

The present disclosure relates to a multilayer ceramic electronic component. FIGS. 1 through 5 are schematic views illustrating a multilayer ceramic electronic component according to an exemplary embodiment in the present disclosure. Referring to FIGS. 1 through 5, a multilayer ceramic electronic component 100 according to an exemplary embodiment in the present disclosure may include a ceramic body 110 including dielectric layers 111 and first internal electrodes 121 and second internal electrodes 122 disposed to face each other with the respective dielectric layers 111 interposed therebetween; a first external electrode 131 connected to the first internal electrodes 121; a second external electrode 132 connected to the second internal electrodes 122; and a protective layer 140 disposed on the ceramic body 110, the first external electrode 131, and the second external electrode 132.

In this case, the protective layer 140 may include an adhesion assisting layer 140b and a coating layer 140a. In order to improve moisture resistance reliability of the multilayer ceramic electronic component, a method of forming a water repellent layer or the like on an outer surface of the multilayer ceramic electronic component may be used. However, this method generally has a limitation that bonding force between a surface of the ceramic body and the water repellent layer is not strong, and has a problem that it is difficult to sufficiently secure reliability of a chip when the multilayer ceramic electronic component is exposed to repetitive vibrations. The present inventors have proposed a structure in which the protective layer 140 disposed on a surface of the multilayer ceramic electronic component includes the adhesion assisting layer 140b and the coating layer 140a in order to solve the problem as described above. As a result, moisture resistance reliability may be improved through moisture penetration prevention, ion migration suppression, and improvement of a bonding strength with the multilayer ceramic electronic component.

The multilayer ceramic electronic component 100 according to an exemplary embodiment in the present disclosure may include the ceramic body 110 including the dielectric layers 111 and the first and second internal electrodes 121 and 122 alternately stacked with the respective dielectric layers 111 interposed therebetween.

The ceramic body 110 may include first and second surfaces S1 and S2 opposing each other in the first direction (the X direction), third and fourth surfaces S3 and S4 opposing each other in the second direction (the Y direction), and fifth and sixth surfaces S5 and S6 opposing each other in the third direction (the Z direction).

A specific shape of the ceramic body 110 is not particularly limited, but may be a hexahedral shape or a shape similar to the hexahedral shape, as illustrated. Although the ceramic body 110 does not have a hexahedral shape having perfectly straight lines due to shrinkage of ceramic powders included in the ceramic body 110 in a sintering process, the ceramic body 110 may have substantially the hexahedral shape. The ceramic body 110 may be subjected to round treatment so that edges thereof are not angulate, if necessary.

The round treatment may be, for example, barrel polishing or the like, but is not limited thereto.

The dielectric layers 111, the first internal electrodes 121, and the second internal electrodes 122 may be alternately stacked in the ceramic body 110. The dielectric layers 111, the first internal electrodes 121, and the second internal electrodes 122 may be stacked in the third direction (the Z direction). The plurality of dielectric layers 111 may be in a sintered state, and adjacent dielectric layers 111 may be integrated with each other so that boundaries therebetween are not readily apparent without using a scanning electron microscope (SEM).

According to an exemplary embodiment in the present disclosure, the dielectric layer 111 may include a component represented by $(Ba_{1-x}Ca_x)(Ti_{1-y}(Zr, Sn, Hf)_y)O_3$ (here, $0 \leq x \leq 1$ and $0 \leq y \leq 0.5$). The component may be, for example, a compound in which Ca, Zr, Sn, and/or Hf are partially solid-dissolved in $BaTiO_3$. In the above composition formula, x may be in the range of 0 or more and 1 or less, and y may be in the range of 0 or more and 0.5 or less, but is not limited thereto. For example, when x is 0, y is 0, and z is 0 in the above composition formula, a component may be $BaTiO_3$. In addition, various ceramic additives, organic solvents, plasticizers, binders, dispersants, and the like, may be added to the component according to an object of the present disclosure.

The dielectric layers 111 may be formed by adding an additive as necessary to slurry including the material described above and applying and then drying the slurry to carrier films to prepare a plurality of ceramic sheets. The ceramic sheets may be formed by manufacturing the slurry in a sheet shape having a thickness of several micrometers by a doctor blade method, but are not limited thereto.

The ceramic body 110 may be formed by alternately stacking ceramic green sheets on which the first internal electrodes 121 are printed and ceramic green sheets on which the second internal electrodes 122 are printed, on the dielectric layers 111 in the third direction (the Z direction). A method of printing the first and second internal electrodes may be a screen printing method, a gravure printing method or the like, but is not limited thereto.

The first and second internal electrodes 121 and 122 may be stacked so that end surfaces thereof are exposed, respectively, to opposite portions of the ceramic body 110 opposing each other. Specifically, the first and second internal electrodes 121 and 122 may be exposed to opposite surfaces of the ceramic body 110 in the first direction (X direction), respectively, the first internal electrodes 121 may be exposed to a first surface S1 of the ceramic body 110, and the second internal electrodes 122 may be exposed to a second surface S2 of the ceramic body 110.

The first and second internal electrodes 121 and 122 may include a conductive metal. The conductive metal may include one or more of, for example, silver (Ag), nickel (Ni), copper (Cu), tin (Sn), palladium (Pd), platinum (Pt), iron (Fe), gold (Au), silver (Ag), tungsten (W), titanium (Ti), lead (Pb), and alloys thereof. The first and second internal electrodes 121 and 122 may be formed using a conductive paste including the conductive metal.

In the multilayer ceramic electronic component according to the present disclosure, the first external electrode 131 and the second external electrode 132 may be disposed on outer surfaces of the ceramic body 110. The first external electrode 131 may be disposed on the first surface S1 of the ceramic body 110 of the multilayer ceramic electronic component 100 according to the present disclosure, and the second external electrode 132 may be disposed on the second surface S2 of the ceramic body 120.

The first external electrode 131 may include a first electrode layer 131a, a first conductive layer 131b, and a first metal layer 131c, and the second external electrode 132 may include a second electrode layer 132a, a second conductive layer 132b, and a second metal layer 132c. The first electrode layer 131a may be connected to the first internal electrodes 121, and the second electrode layer 132a may be connected to the second internal electrodes 122. In addition, the first conductive layer 131b may be disposed on the first electrode layer 131a, and the second conductive layer 132b may be disposed on the second electrode layer 132a. The first conductive layer 131b may be disposed to cover the first electrode layer 121a, and the second conductive layer 132b may be disposed to cover the second electrode layer 132a.

In an exemplary embodiment in the present disclosure, the first electrode layer and the second electrode layer of the multilayer ceramic electronic component may be sintered electrodes including a conductive metal. The conductive metal may include one or more of, for example, nickel (Ni), copper (Cu), tin (Sn), palladium (Pd), platinum (Pt), iron (Fe), gold (Au), silver (Ag), tungsten (W), titanium (Ti), lead (Pb), and alloys thereof.

In addition, the first electrode layer 131a and the second electrode layer 132a may include glass. The glass may be a composition in which oxides are mixed with each other, and may be one or more selected from the group consisting of silicon oxide, boron oxide, aluminum oxide, transition metal oxide, alkali metal oxide, and alkaline earth metal oxide, but is not particularly limited thereto. The transition metal may be selected from the group consisting of zinc (Zn), titanium (Ti), copper (Cu), vanadium (V), manganese (Mn), iron (Fe), and nickel (Ni), an alkali metal may be selected from the group consisting of lithium (Li), sodium (Na) and potassium (K), and an alkaline earth metal may be at least one selected from the group consisting of magnesium (Mg), calcium (Ca), strontium (Sr), and barium (Ba).

The first electrode layer 131a and the second electrode layer 132a may be formed by dipping and then sintering the ceramic body in a conductive paste including a conductive metal or may be formed by printing the conductive paste on surfaces of the ceramic body by a screen printing method, a gravure printing method or the like, and then sintering the ceramic body, for example. In addition, the first electrode layer 131a and the second electrode layer 132a may be formed by applying the conductive paste to the surfaces of the ceramic body or transferring a dry film on which the conductive paste is dried onto the ceramic body and then sintering the ceramic body, but are not limited thereto. For example, the first electrode layer 131a and the second electrode layer 132a may be formed by forming the conductive paste on the ceramic body by various methods other than the methods described above, and then sintering the ceramic body.

According to an exemplary embodiment in the present disclosure, the first and second conductive layers disposed on the first and second electrode layers of the multilayer ceramic electronic component, respectively, may be plating layers. The first and second conductive layers may contain nickel (Ni) most abundantly, and may include one or more selected from the group consisting of copper (Cu), tin (Sn), palladium (Pd), platinum (Pt), gold (Au), silver (Ag), tungsten (W), titanium (Ti), lead (Pb), and alloys thereof, but are not limited thereto. The plating layer may be one layer or a plurality of layers and may be formed by sputtering or electric deposition, but is not limited thereto.

In an exemplary embodiment in the present disclosure, the first and second metal layers disposed on the first and second conductive layers of the multilayer ceramic electronic component, respectively, may be plating layers. The first metal layer may be disposed to cover the first conductive layer, and the second metal layer may be disposed to cover the second conductive layer. The first and second metal layers may contain tin (Sn) most abundantly, and may include one or more selected from the group consisting of copper (Cu), nickel (Nn), palladium (Pd), platinum (Pt), gold (Au), silver (Ag), tungsten (W), titanium (Ti), lead (Pb), and alloys thereof, but are not limited thereto.

In an exemplary embodiment, at least portions of the first external electrode 131 of the multilayer ceramic electronic component according to the present disclosure may extend to and be disposed on the third surface S3, the fourth surface S4, the fifth surface S5, and the sixth surface S6 of the ceramic body 110. In addition, at least portions of the second external electrode 132 may extend to and be disposed on the third surface S3, the fourth surface S4, the fifth surface S5, and the sixth surface S6 of the ceramic body 110. In this case, the first external electrode 131 and the second external electrode 132 may be disposed to be spaced apart from each other. When at least portions of each of the first external electrode 131 and/or the second external electrode 132 extend to and are disposed on the third surface S3, the fourth surface S4, the fifth surface S5, and the sixth surface S6 of the ceramic body 110, the extending portions may function as so-called band portions, and may function to improve a mounting strength of the multilayer ceramic electronic component 100 according to the present disclosure and prevent moisture penetration into the multilayer ceramic electronic component 100.

In the multilayer ceramic electronic component according to the present disclosure, the protective layer 140 may be disposed on the ceramic body, the first external electrode, and the second external electrode described above. The protective layer 140 may be disposed to cover the ceramic body, the first external electrode, and the second external electrode. In the present specification, the meaning that a certain member is disposed to cover the ceramic body 110 is that the member is disposed so that a portion of the ceramic body 110 covered by the member is not exposed externally. In this case, the protective layer 140 may be disposed to cover the entirety of the ceramic body, the first external electrode, and the second external electrode. That is, the protective layer 140 according to the present disclosure may be disposed to cover the entire surfaces of the multilayer ceramic electronic component. Therefore, moisture resistance reliability more excellent than that in a case where the protective layer 140 is formed only on a portion of the multilayer ceramic electronic component may be obtained.

The protective layer 140 may include the adhesion assisting layer 140b and the coating layer 140a. The adhesion assisting layer 140b and the coating layer 140a may be sequentially stacked on the ceramic body, in the order of the ceramic body, the first external electrode, and the second external electrode. In this case, the adhesion assisting layer 140b may be disposed to be in direct contact with the ceramic body, the first external electrode, and the second external electrode, and the coating layer 140a may be disposed on the adhesion assisting layer 140b.

In one exemplary embodiment, the coating layer 140a covering the first external electrode 131 and the coating layer 140a covering the second external electrode 132 may be connected to each other. In another exemplary embodiment, the coating layer 140a may cover the entire surface of the multilayer ceramic electronic component.

On the other hand, the adhesion assisting layer 140b covering the first external electrode 131 and the adhesion assisting layer 140b covering the second external electrode 132 may be spaced apart from each other.

In this case, the protective layer 140 may include a crosslink linking the adhesion assisting layer 140b and the coating layer 140a to each other. In the present specification, the term "bond" refers to a state in which surfaces of an adhesive and an adherend are bonded to each other by bonding force of an interface. The bonding force of the interface may be due to a chemical interaction between surface molecules of the adhesive and the adherend, or may be due to mechanical bonding. In the present specification, the term "crosslink" refers to forming a network structure through chemical/physical bonds such as covalent bonds, ionic bonds, Van der Waals bonds, or hydrogen bonds between molecules. The adhesion assisting layer 140b and the coating layer 140a may be connected to each other through the crosslink to have a more excellent bonding force.

In an exemplary embodiment in the present disclosure, a component of the adhesion assisting layer 140b of the multilayer ceramic electronic component is not particularly limited as long as it exhibits an excellent adhesive force to the ceramic body and/or a coating layer 140a to be described later. The adhesion assisting layer 140b may include one or more selected from the group consisting of a polystyrene-based polymer, a vinyl acetate-based polymer, a polyester-based polymer, a polyethylene-based polymer, a polypropylene-based polymer, a polyamide-based polymer, a rubber-based polymer, an acrylic polymer, a phenol-based polymer, an epoxy-based polymer, a urethane-based polymer, an siloxane-based polymer, an melamine-based polymer, and an alkyd-based polymer, but is not limited thereto.

In an exemplary embodiment, the polymer of the adhesion assisting layer 140b of the multilayer ceramic electronic component according to the present disclosure may include a compound including two or more vinyl groups. The compound including the two or more vinyl groups, which is to improve a mechanical/chemical strength of the protective layer 140 according to the present disclosure, may be bonded to the surface of the ceramic body, and may form a crosslink with a coating layer 140a to be described later. In the multilayer ceramic electronic component according to the present disclosure, bonding force of the adhesion assisting layer 140b with the surface of the ceramic body and/or the coating layer 140a may be improved by applying the compound including the two or more vinyl groups to the adhesion assisting layer 140b.

The compound containing two vinyl groups is not particularly limited, and may include, for example, 2,4,6,8-tetramethyl-2,4,6,8-tetravinylcyclotetrasiloxane (V4D4), 1,3,5-trimethyl-1,3,5-trivinyl-cyclotrisiloxane (V3D3), divinylbenzene (DVB), diethyleneglycoldivinylether (DE-GDVE), ethyleneglycoldiacrylate (EGDA), ethyleneglycoldimethacrylate (EGDMA), 1,3-diethenyl-1,1,3,3-tetramethyl-disiloxane (V2D2), and the like.

A thickness of the adhesion assisting layer 140b is not particularly limited as long as a sufficient bonding force may be secured, and may be in the range of, for example, 21 nm or more and/or 420 nm or less.

In an exemplary embodiment in the present disclosure, the coating layer 140a of the protective layer 140 of the multilayer ceramic electronic component may include a hydrophobic polymer. The hydrophobic polymer may refer to a polymer formed from a hydrophobic monomer. In the present specification, the term "hydrophobicity" may mean that a surface formed of a certain component has a contact angle of 90° or more with respect to water at room temperature/1 atmosphere. The hydrophobic monomer is not particularly limited as long as it exhibits sufficient water repellent capability, and may include one or more monomers selected from the group consisting of siloxanes, acryls, amines, carbonates, esters, and fluorocarbons.

In an exemplary embodiment, the coating layer 140a of the multilayer ceramic electronic component according to the present disclosure may include a compound including a vinyl group and fluorine. The vinyl group may form a crosslink with the adhesion assisting layer 140b described above to enhance bonding force of the coating layer 140a, and fluorine may provide excellent water repellency and physical/chemical resistance to external contaminants.

A type of the compound including the vinyl group and fluorine is not particularly limited. The compound including the vinyl group and fluorine may include, for example, 1H,1H,2H,2H-perfluorodecylacrylate (PFDA), perfluorodecyl methacrylate (PFDMA), dodecafluoroheptyl acrylate, pentafluorophenyl methacrylate, 3,3,4,4,5,5,6,6,7,7,8,8,9,9,9-pentadecafluorononyl acrylate, 2-methyl-3,3,4,4,5,5,6,6,7,7,8,8,9,9,9-pentadecafluorononyl acrylate, 3,3,4,4,5,5,6,6,7,7,8,8,8-tridecafluorooctyl acrylate, 2-methyl-3,3,4,4,5,5,6,6,7,7,8,8,8-tridecafluorooctyl acrylate, 3,3,4,4,5,5,6,6,7,7,7-undecafluoroheptyl acrylate, 2-methyl-3,3,4,4,5,5,6,6,7,7,7-undecafluorohept ylacrylate, 3,3,4,4,5,5,6,6,6-nonafluorohexyl acrylate, 2-methyl-3,3,4,4,5,5,6,6,6-nonafluorohexyl acrylate, 3,3,4,4,5,5,6,6,7,7,8,8,9,9,10,10,11,11,11-nonadecafluoroundecyl acrylate, 2-methyl-3,3,4,4,5,5,6,6,7,7,8,8,9,9,10,10,11,11,11-nonadecafluoroundecyl acrylate, 3,3,4,4,5,5,6,6,7,7,8,8,9,9,10,10,11,11,12,12,12-heneicosafluorododecyl acrylate, 2-methyl-3,3,4,4,5,5,6,6,7,7,8,8,9,9,10,10,11,11,12,12,12-heneicosafluorododecyl acrylate, 3,3,4,4,5,5,6,6,7,7,8,8,9,9,10,10,11,11,12,12,13,13-tricosafluorotridecyl acrylate, 2-methyl-3,3,4,4,5,5,6,6,7,7,8,8,9,9,10,10,11,11,12,12,13,13,13-tricosafluorotridecyl acrylate, 3,3,4,4,5,5,6,6,7,7,8,8,9,9,10,10,11,11,12,12,13,13,14,14,14-pentacosafluorotetradecyl acrylate, 2-methyl-3,3,4,4,5,5,6,6,7,7,8,8,9,9,10,10,11,11,12,12,13,13,14,14,14-pentacosafluorotetradecyl acrylate, and the like, but are not limited thereto.

In another exemplary embodiment in the present disclosure, the coating layer 140a of the multilayer ceramic electronic component may be an inorganic thin film layer. The inorganic thin film layer may be formed of an oxide or a nitride of a metal and/or non-metal compound or compounds thereof. In the present exemplary embodiment, when the coating layer 140a of the protective layer 140 is the inorganic thin film layer, a chemical reaction with external contaminants may be significantly reduced, such that reliability of the protective layer 140 may be improved. A component of the inorganic thin film layer is not particularly limited, and may include, for example, one or more oxides selected from the group consisting of $Al_2O_3$, $HfO_2$, $ZrO_2$ $La_2O_3$, $SiO_2$, $Ta_2O_5$, $Nb_2O_5$, $Y_2O_3$, $SrTiO_3$, and $BaTiO_3$ or one or more nitrides selected from the group consisting of AlN and $SiN_x$.

A thickness of the coating layer 140a is not particularly limited as long as a sufficient bonding force may be secured, and may be in the range of, for example, 21 nm or more and/or 420 nm or less.

In an exemplary embodiment in the present disclosure, the protective layer 140 of the multilayer ceramic electronic component may have an average thickness of 70 nm or more and/or 600 nm or less. In the present specification, the term "thickness" may refer to a thickness of a certain member measured in a direction perpendicular to a surface of the member, and the term "average thickness" may refer to an arithmetic average of thicknesses measured at points where a region in which the protective layer 140 is disposed is divided into ten equal portions at equal intervals with respect to a cross section of the multilayer ceramic electronic component taken along a direction perpendicular to the Z axis while passing through the center of the multilayer ceramic electronic component. The measurement of an average thickness is not limited to these examples, and one of ordinary skill may select the number of measurement points, the interval between the measurement points, and so forth, if needed. The measurement of the thickness for each measurement point may be done by using a microscopy image, for example, a scanning electron microscope (SEM) image, but is not limited thereto. When the thickness of the protective layer 140 of the multilayer ceramic electronic component according to the present exemplary embodiment is less than 70 nm, bonding force of the adhesion assisting layer 140b may be weakened and a water repellent force may be decreased. In addition, when the thickness of the protective layer 140 exceeds 600 nm, suppression performance of ion migration and an adhesive force of the protective layer 140 may be excellent, but bonding force of the external electrode with a solder may be decreased due to an excessively thickness of the protective layer 140, such that a fixing strength of the multilayer ceramic electronic component on a board may be decreased at the time of mounting the multilayer ceramic electronic component on the board.

Figure 5:
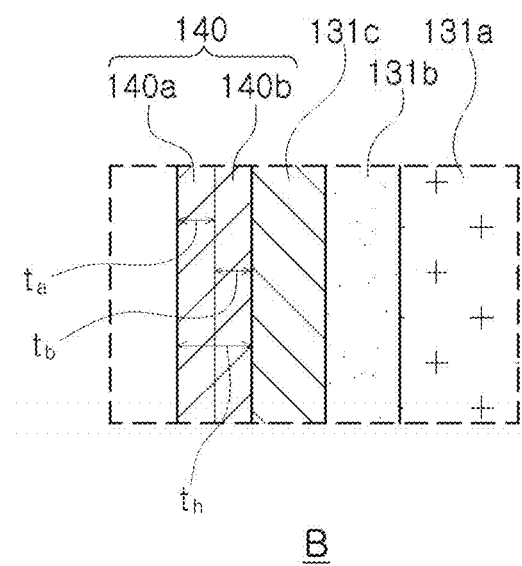
FIG. 5 is an enlarged view of region B of FIG. 4.

In an exemplary embodiment, a ratio of an average thickness of the coating layer 140a to the average thickness of the protective layer 140 of the multilayer ceramic electronic component according to the present disclosure may be in the range of 0.3 or more and/or 0.7 or less. Referring to FIG. 5, the thickness of the protective layer 140 of the multilayer ceramic electronic component according to the present disclosure may be the sum of the thickness of the adhesion assisting layer 140b and the thickness of the coating layer 140a, and the average thickness of the coating layer 140a may be 0.3 or more and/or 0.7 or less of the average thickness of the protective layer 140. The average thickness of the coating layer 140a may be a value measured by the same method as the average thickness of the protective layer 140 described above. When the ratio of the average thickness of the coating layer 140a to the average thickness of the protective layer 140 is lower than 0.3, sufficient water repellent force may not be secured, such that ion migration may not be suppressed, and when the ratio of the average thickness of the coating layer 140a to the average thickness of the protective layer 140 exceeds 0.7, the adhesion assisting layer 140b may become excessive thin, such that a bonding strength of the protective layer 140 may be decreased.

A method of forming the adhesion assisting layer 140b and the coating layer 140a of the multilayer ceramic electronic component according to the present disclosure is not particularly limited. The adhesion assisting layer 140b and the coating layer 140 may be formed by, for example, an atomic layer deposition (ALD) method, a molecular layer deposition (MLD) method, a chemical vapor deposition (CVD) method, a sputtering method, or the like, but are not limited thereto.

A multilayer ceramic electronic component 100 according to another exemplary embodiment in the present disclosure may include a ceramic body 110 including dielectric layers 111 and first internal electrodes 121 and second internal electrodes 122 disposed to face each other with the respective dielectric layers 111 interposed therebetween; a first external electrode 131 connected to the first internal electrodes 121; a second external electrode 132 connected to the second internal electrodes 122; and a cover layer 140 disposed on the ceramic body 110, the first external electrode 131, and the second external electrode 132.

In this case, the cover layer 140 may include a first layer 140b and a second layer 140a. In order to improve moisture resistance reliability of the multilayer ceramic electronic component, a method of forming a water repellent layer or the like on an outer surface of the multilayer ceramic electronic component may be used. However, this method generally has a limitation that bonding force between a surface of the ceramic body and the water repellent layer is not strong, and has a problem that it is difficult to sufficiently secure reliability of a chip when the multilayer ceramic electronic component is exposed to repetitive vibrations. The present inventors have proposed a structure in which the cover layer disposed on a surface of the multilayer ceramic electronic component includes the first layer 140b and the second layer 140a in order to solve the problem as described above. As a result, moisture resistance reliability may be improved through moisture penetration prevention, ion migration suppression, and improvement of a bonding strength with the multilayer ceramic electronic component.

In the multilayer ceramic electronic component according to the present disclosure, the cover layer may be disposed on the ceramic body, the first external electrode, and/or the second external electrode described above. The cover layer may be disposed to cover at least portions of the ceramic body, the first external electrode, and/or the second external electrode. In the present specification, the meaning that a certain member is disposed to cover the ceramic body 110 is that the member is disposed so that a portion of the ceramic body 110 covered by the member is not exposed externally. In this case, the cover layer may be disposed to cover substantially the entirety of the ceramic body, the first external electrode, and/or the second external electrode. In the present specification, the meaning that a certain member "covers substantially the entirety" of a predetermined region is that not only the member is disposed to cover the entirety of the region in a strict sense, but an error or the like in a manufacturing process is also included, and may be, for example, that a ratio in a region in which the member is not disposed in an entire area of the region is 0% or more and/or 5% or less. In an exemplary embodiment in the present disclosure, the cover layer may be disposed to cover the entire surfaces of the multilayer ceramic electronic component. Therefore, moisture resistance reliability more excellent than that in a case where the cover layer is formed only on a portion of the multilayer ceramic electronic component may be obtained.

The cover layer may include the first layer and the second layer. The first layer and the second layer may be sequentially stacked and disposed on the ceramic body, the first external electrode, and the second external electrode. In this case, the first layer may be disposed to be in direct contact with the ceramic body, the first external electrode, and the second external electrode, and the second layer may be disposed on the first layer.

In this case, the cover layer may include a crosslink linking the first layer and the second layer to each other.

In an exemplary embodiment in the present disclosure, a component of the second layer of the multilayer ceramic electronic component is not particularly limited as long as it exhibits an excellent adhesive force to the ceramic body and/or a first layer to be described later. The first layer 140b may include one or more selected from the group consisting of a polystyrene-based polymer, a vinyl acetate-based polymer, a polyester-based polymer, a polyethylene-based polymer, a polypropylene-based polymer, a polyamide-based polymer, a rubber-based polymer, an acrylic polymer, a phenol-based polymer, an epoxy-based polymer, a urethane-based polymer, an siloxane-based polymer, an melamine-based polymer, and an alkyd-based polymer, but is not limited thereto.

In an exemplary embodiment, the polymer of the first layer of the multilayer ceramic electronic component according to the present disclosure may include a compound including two or more vinyl groups. The compound including the two or more vinyl groups, which is to improve mechanical/chemical strength of the cover layer according to the present disclosure, may be bonded to the surface of the ceramic body, and may form a crosslink with a second layer to be described later. In the multilayer ceramic electronic component according to the present disclosure, bonding force of the first layer with the surface of the ceramic body and/or the second layer may be improved by applying the compound including the two or more vinyl groups to the first layer.

The compound containing two vinyl groups is not particularly limited, and may include, for example, 2,4,6,8-tetramethyl-2,4,6,8-tetravinylcyclotetrasiloxane (V4D4), 1,3,5-trimethyl-1,3,5-trivinyl-cyclotrisiloxane (V3D3), divinylbenzene (DVB), diethyleneglycoldivinylether (DEGDVE), ethyleneglycoldiacrylate (EGDA), ethyleneglycoldimethacrylate (EGDMA), 1,3-diethenyl-1,1,3,3-tetramethyl-disiloxane (V2D2), and the like.

A thickness of the first layer is not particularly limited as long as a sufficient bonding force may be secured, and may be in the range of, for example, 21 nm or more and/or 420 nm or less.

In an exemplary embodiment in the present disclosure, the second layer of the cover layer of the multilayer ceramic electronic component may include a hydrophobic polymer. The hydrophobic polymer may refer to a polymer formed from a hydrophobic monomer.

In an exemplary embodiment, the second layer of the multilayer ceramic electronic component according to the present disclosure may include a compound including a vinyl group and fluorine.

In another exemplary embodiment in the present disclosure, the second layer of the multilayer ceramic electronic component may be an inorganic thin film layer.

A thickness of the second layer is not particularly limited as long as a sufficient bonding force may be secured, and may be in the range of, for example, 21 nm or more and/or 420 nm or less.

In an exemplary embodiment in the present disclosure, the cover layer of the multilayer ceramic electronic component may have an average thickness of 70 nm or more and/or 600 nm or less.

In an exemplary embodiment, a ratio of an average thickness of the second layer to the average thickness of the cover layer of the multilayer ceramic electronic component according to the present disclosure may be in the range of 0.3 or more and/or 0.7 or less.

A method of forming the first layer and the second layer of the multilayer ceramic electronic component according to the present disclosure is not particularly limited. The first layer and the second layer may be formed by, for example, an ALD method, an MLD method, a CVD method, a sputtering method, or the like, but are not limited thereto.

<Experimental Example>

Ion migration suppression, bonding strength, mounting defects, and a moisture resistance load defect of the multilayer ceramic electronic component according to the present disclosure were tested under the following conditions.

Components used in the test were multilayer ceramic capacitors (MLCCs) in which first and second electrode layers were formed on a ceramic body using copper (Cu), and Ni and Sn plating layers were then sequentially formed. One hundred products for mass production having a size of 1.6 mm×0.8 mm×0.8 mm and available from Samsung Electro-Mechanics were used as the MLCCs.

A protective layer was formed on the multilayer ceramic electronic component using an initiated chemical vapor deposition (iCVD) equipment. Tetra-butyl peroxide (TBPO) was used as an deposition initiator, and 2,4,6,8-tetramethyl-2,4,6,8-tetravinylcyclotetrasiloxane (V4D4) and perfluorodecyl methacrylate (PFDMA) were used as materials of an adhesion assisting layer and a coating layer, respectively.

As a deposition condition, the multilayer ceramic electronic component was disposed on a board maintained at 40° C., and a filament temperature was set at 200° C. Thereafter, a deposition time was adjusted to manufacture multilayer ceramic electronic components of which thicknesses of protective layers are different from each other as follows.

Figure 6A:
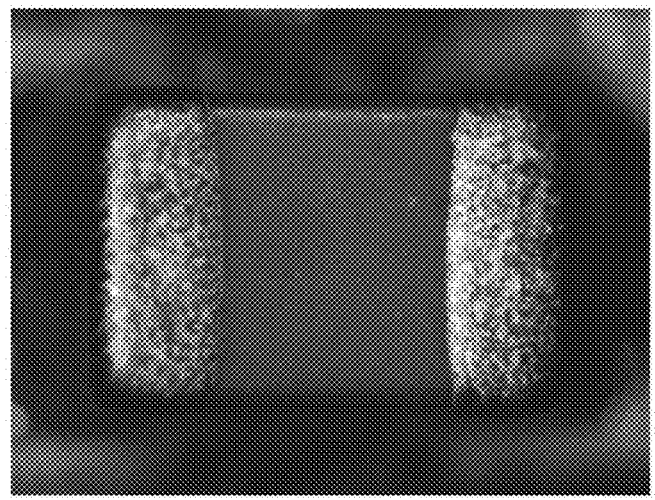
FIG. 6A is a captured image of a multilayer ceramic electronic component in which ion migration has not occurred.
Figure 6B:
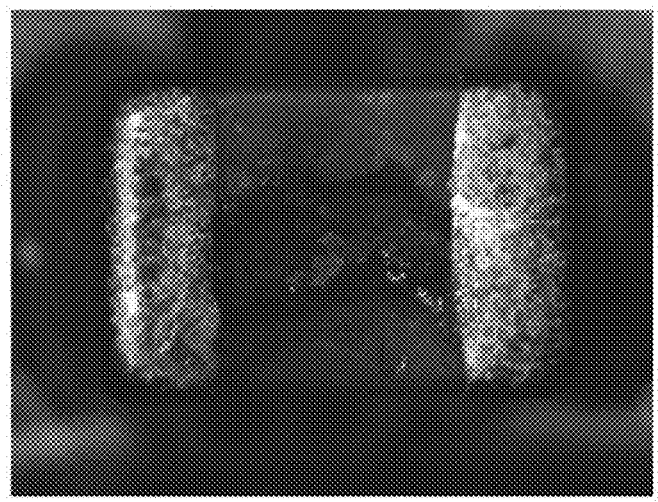
FIG. 6B is a captured image of a multilayer ceramic electronic component in which ion migration has occurred.

An ion migration test was conducted by dropping 1.3 ml of distilled water between both external electrodes under a condition of 25° C. and 1 atmosphere and then applying direct current (DC) power of 15V to the external electrodes. As ion migration proceeds after the power is applied to the external electrodes, it was observed that dendrites of a metal component grow from a negative electrode of the MLCC to a positive electrode of the MLCC. At the moment when both electrodes of the multilayer ceramic electronic component are connected to each other with the grown dendrites, a current of 1 mA or more flows, and the number of multilayer ceramic electronic components in which the current flows within five minutes was measured. FIG. 6A is a captured image of a multilayer ceramic electronic component in which ion migration has not occurred, and FIG. 6B is a captured image of a multilayer ceramic electronic component in which ion migration has occurred.

A bonding strength test was conducted using an adhesive tape of which a delamination force measured at a speed of 300 mm/min and an angle of 90° at 25° C. with respect to a glass substrate is 30 gf/25 mm. The adhesive tapes were attached to surfaces of the multilayer ceramic electronic components, and after 1 minute has elapsed, a force was applied at an angle of 90° to the adhesive tapes to detach the adhesive tapes from the multilayer ceramic electronic components. The number of components in which protective layers were removed on the surfaces to which the adhesive tapes were attached after the adhesive tapes were detached was measured.

Figure 7A:
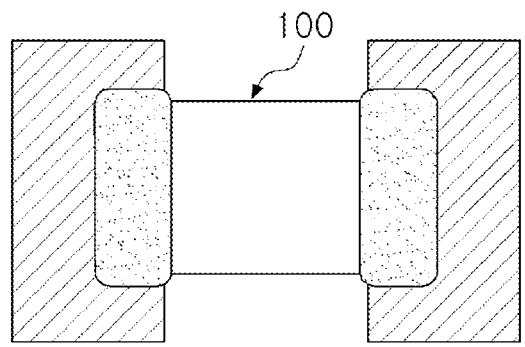
FIG. 7A is a captured image of a multilayer ceramic electronic component that is normally mounted on a board.
Figure 7B:
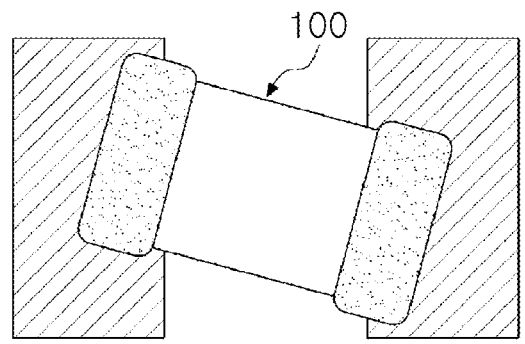
FIG. 7B is a captured image of a multilayer ceramic electronic component of which misalignment has occurred at the time of mounting the multilayer ceramic electronic component on a board.
Figure 7C:
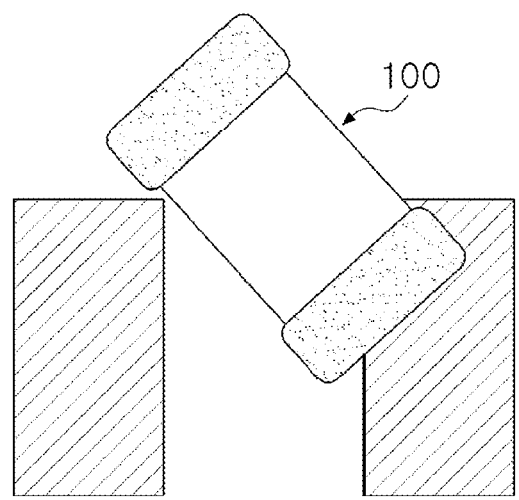
FIG. 7C is a captured image of a multilayer ceramic electronic component of which separation from a board has occurred at the time of mounting the multilayer ceramic electronic component on the board.

In a mounting failure test, multilayer ceramic electronic components were mounted on boards to which electrode pads are attached, using solders, and the number of misaligned multilayer ceramic electronic components was measured. FIG. 7A is a captured image of a multilayer ceramic electronic component that is not misaligned, FIG. 7B is a captured image of a multilayer ceramic electronic component of which misalignment has occurred, and FIG. 7C is a captured image of a multilayer ceramic electronic component in a case where the multilayer ceramic electronic component is separated.

In a moisture resistance load test, the number of multilayer ceramic electronic components in which defects have occurred when a rated voltage was applied to the multilayer ceramic electronic components at a temperature of 85° C. and a relative humidity of 85% was measured.

TABLE 1

| Thickness (nm) of Protective Layer | Migration Defect | Bonding Strength (Tape Test) | Mounting Defect | Moisture Resistance Load Test Defect |
|---|---|---|---|---|
| 30 | 15/100 | 34/100 | 0/100 | 21/100 |
| 50 | 4/100 | 9/100 | 0/100 | 7/100 |
| 70 | 0/100 | 0/100 | 0/100 | 0/100 |
| 100 | 0/100 | 0/100 | 0/100 | 0/100 |
| 150 | 0/100 | 0/100 | 0/100 | 0/100 |
| 200 | 0/100 | 0/100 | 0/100 | 0/100 |
| 300 | 0/100 | 0/100 | 0/100 | 0/100 |
| 400 | 0/100 | 0/100 | 0/100 | 0/100 |
| 500 | 0/100 | 0/100 | 0/100 | 0/100 |
| 600 | 0/100 | 0/100 | 0/100 | 0/100 |
| 700 | 0/100 | 0/100 | 13/100 | 0/100 |
| 800 | 0/100 | 0/100 | 64/100 | 0/100 |

Referring to Table 1, it may be confirmed that when a thickness of the protective layer is 30 nm and 50 nm, amounting defect does not occur, but defects occur in all of the ion migration test, the bonding strength test, and the moisture resistance load test, and it may be confirmed that when a thickness of the protective layer is 70 nm or more, defects do not occur at all in the ion migration test, the bonding strength test, the mounting defect test, and the moisture resistance load test. In addition, it may be confirmed that when a thickness of the protective layer is 700 nm and 800 nm, a plurality of mounting defects occur, and it may be confirmed that when a thickness of the protective layer is 600 nm or less, defects do not occur at all in the ion migration test, the bonding strength test, the mounting defect test, and the moisture resistance load test. Therefore, it may be confirmed that when the thickness of the protective layer of the multilayer ceramic electronic component according to the present disclosure is in the range of 70 nm or more to 600 nm or less, an excellent multilayer ceramic electronic component in which the ion migration is effectively suppressed, the bonding strength of the protective layer is excellent, and the mounting defect and the moisture resistance load defect do not occur may be provided.

As set forth above, according to an exemplary embodiment in the present disclosure, deterioration of characteristics of the multilayer ceramic electronic component due to penetration of moisture into the multilayer ceramic electronic component may be prevented.

In addition, ion migration in the multilayer ceramic electronic component may be suppressed.

Further, a defect such as a short circuit in the multilayer ceramic electronic component may be reduced.

Further, the multilayer ceramic electronic component having excellent reliability may be provided.

While exemplary embodiments have been shown and described above, it will be apparent to those skilled in the art that modifications and variations could be made without departing from the scope of the present invention as defined by the appended claims.

What is claimed is:

1. A multilayer ceramic electronic component comprising:
a ceramic body including dielectric layers and first internal electrodes and second internal electrodes disposed to face each other and alternately stacked with the respective dielectric layers interposed therebetween;
a first external electrode connected to the first internal electrodes;
a second external electrode connected to the second internal electrodes; and
a protective layer disposed on the ceramic body, the first external electrode, and the second external electrode,
wherein the protective layer includes an adhesion assisting layer and a coating layer and comprises a polymer.

2. The multilayer ceramic electronic component of claim 1, wherein an average thickness of the protective layer is 70 nm or more and/or 600 nm or less.

3. The multilayer ceramic electronic component of claim 1, wherein a ratio of an average thickness of the coating layer to an average thickness of the protective layer is in the range of 0.3 or more and/or 0.7 or less.

4. The multilayer ceramic electronic component of claim 1, wherein the protective layer includes a crosslink linking the adhesion assisting layer and the coating layer to each other.

5. The multilayer ceramic electronic component of claim 1, wherein the protective layer is disposed to cover at least portions of the ceramic body, the first external electrode, and the second external electrode.

6. The multilayer ceramic electronic component of claim 1, wherein the adhesion assisting layer includes one or more selected from a group consisting of a polystyrene-based polymer, a vinyl acetate-based polymer, a polyester-based polymer, a polyethylene-based polymer, a polypropylene-based polymer, a polyamide-based polymer, a rubber-based polymer, an acrylic polymer, a phenol-based polymer, an epoxy-based polymer, a urethane-based polymer, an siloxane-based polymer, an melamine-based polymer, and an alkyd-based polymer.

7. The multilayer ceramic electronic component of claim 6, wherein the one or more selected polymer of the adhesion assisting layer includes a compound including two or more vinyl groups.

8. The multilayer ceramic electronic component of claim 1, wherein the coating layer includes a hydrophobic polymer.

9. The multilayer ceramic electronic component of claim 8, wherein the coating layer includes a compound including a vinyl group and fluorine.

10. The multilayer ceramic electronic component of claim 1, wherein the coating layer is an inorganic thin film layer.

11. The multilayer ceramic electronic component of claim 10, wherein the coating layer includes one or more selected from a group consisting of $Al_2O_3$, $HfO_2$, $ZrO_2$ $La_2O_3$, $SiO_2$, $Ta_2O_5$, $Nb_2O_5$, $Y_2O_3$, $SrTiO_3$, $BaTiO_3$, $AlN$, and $SiN_x$.

12. The multilayer ceramic electronic component of claim 1, wherein the coating layer is disposed to cover the adhesion assisting layer.

13. A multilayer ceramic electronic component comprising:
a ceramic body including dielectric layers and first internal electrodes and second internal electrodes disposed to face each other and alternately stacked with the respective dielectric layers interposed therebetween;
a first external electrode connected to the first internal electrodes;
a second external electrode connected to the second internal electrodes; and
a cover layer disposed on the ceramic body, the first external electrode, and the second external electrode, wherein the cover layer includes a first layer comprising a polymer and a second layer.

14. The multilayer ceramic electronic component of claim 13, wherein an average thickness of the cover layer is 70 nm or more and/or 600 nm or less.

15. The multilayer ceramic electronic component of claim 13, wherein a ratio of an average thickness of the second layer to an average thickness of the cover layer is in the range of 0.3 or more and/or 0.7 or less.

16. The multilayer ceramic electronic component of claim 13, wherein the cover layer includes a crosslink linking the first layer and the second layer to each other.

17. The multilayer ceramic electronic component of claim 13, wherein the cover layer is disposed to cover at least portions of the ceramic body, the first external electrode, and the second external electrode.

18. The multilayer ceramic electronic component of claim 13, wherein the first layer includes one or more selected from a group consisting of a polystyrene-based polymer, a vinyl acetate-based polymer, a polyester-based polymer, a polyethylene-based polymer, a polypropylene-based polymer, a polyamide-based polymer, a rubber-based polymer, an acrylic polymer, a phenol-based polymer, an epoxy-based polymer, a urethane-based polymer, an siloxane-based polymer, an melamine-based polymer, and an alkyd-based polymer.

19. The multilayer ceramic electronic component of claim 18, wherein the one or more selected polymer of the first layer includes a compound including two or more vinyl groups.

20. The multilayer ceramic electronic component of claim 13, wherein the second layer includes a hydrophobic polymer.

21. The multilayer ceramic electronic component of claim 20, wherein the second layer includes a compound including a vinyl group and fluorine.

22. The multilayer ceramic electronic component of claim 13, wherein the second layer is an inorganic thin film layer.

23. The multilayer ceramic electronic component of claim 22, wherein the second layer includes one or more selected from a group consisting of $Al_2O_3$, $HfO_2$, $ZrO_2$ $La_2O_3$, $SiO_2$, $Ta_2O_5$, $Nb_2O_5$, $Y_2O_3$, $SrTiO_3$, $BaTiO_3$, $AlN$, and $SiN_x$.

24. The multilayer ceramic electronic component of claim 13, wherein the first external electrode includes a first electrode layer connected to the first internal electrodes, a first conductive layer disposed on the first electrode layer, and a first metal layer disposed on the first conductive layer, and
the second external electrode includes a second electrode layer connected to the second internal electrodes, a second conductive layer disposed on the second electrode layer, and a second metal layer disposed on the second conductive layer.

25. The multilayer ceramic electronic component of claim 24, wherein the first electrode layer and the second electrode layer are sintered electrodes including a conductive metal.

26. The multilayer ceramic electronic component of claim 24, wherein the first conductive layer and the second conductive layer are plating layers.

27. The multilayer ceramic electronic component of claim 24, wherein the first metal layer and the second metal layer are plating layers.

28. The multilayer ceramic electronic component of claim 13, wherein the second layer is disposed to cover the first layer.

29. A multilayer ceramic electronic component, comprising:
a ceramic body including dielectric layers and first internal electrodes and second internal electrodes disposed to face each other and alternately stacked with the respective dielectric layers interposed therebetween;
first and second external electrodes disposed on the ceramic body and connected to the first and second internal electrodes, respectively; and
a cover layer including a first layer disposed on each of the first and second external electrodes, and a second layer disposed on each first layer and comprising a polymer,
wherein the second layer covering the first external electrode and the second layer covering the second external electrode are connected to each other.

30. The multilayer ceramic electronic component of claim 29, wherein the first layer covering the first external electrode and the first layer covering the second external electrode are spaced apart from each other.

31. The multilayer ceramic electronic component of claim 29, wherein an average thickness of the cover layer is 70 nm or more and/or 600 nm or less.

32. The multilayer ceramic electronic component of claim 29, wherein a ratio of an average thickness of the second layer to an average thickness of the cover layer is in the range of 0.3 or more and/or 0.7 or less.

33. The multilayer ceramic electronic component of claim 29, wherein the first layer includes a polymer, and the polymer of the first layer has a compound including two or more vinyl groups.

34. The multilayer ceramic electronic component of claim 29, wherein the second layer includes a hydrophobic polymer.

35. The multilayer ceramic electronic component of claim 34, wherein the second layer includes a compound including a vinyl group and fluorine.

* * * * *